United States Patent [19]

Bullock, Sr.

[11] Patent Number: 4,546,548

[45] Date of Patent: Oct. 15, 1985

[54] DEVICE AND METHOD FOR MEASURING STEERING AXIS INCLINATION OR A STEERABLE WHEEL

[75] Inventor: James K. Bullock, Sr., Wadsworth, Ill.

[73] Assignee: Ammco Tools, Inc., North Chicago, Ill.

[21] Appl. No.: 559,627

[22] Filed: Dec. 8, 1983

[51] Int. Cl.⁴ .............................................. G01B 5/255
[52] U.S. Cl. ........................................ 33/203; 33/336; 33/203.18; 33/DIG. 1
[58] Field of Search ................ 33/203, 203.12, 203.14, 33/203.18, 203.19, 336, 337, DIG. 1

[56] References Cited

U.S. PATENT DOCUMENTS 2,729,896   1/1956   Rosenblum ............................ 33/336
3,234,656   2/1966   MacMillan ............................. 33/203
3,956,830   5/1976   MacMillan ......................... 33/203.18

FOREIGN PATENT DOCUMENTS 686547   5/1964   Canada ................................. 33/336

*Primary Examiner*—Willis Little
*Attorney, Agent, or Firm*—Edmond T. Patnaude

[57] ABSTRACT

A device and method for measuring the steering axis inclination of a steerable wheel is disclosed. The device includes an adaptor for mounting a caster-camber gauge to the wheel in a plane perpendicular to the axis of rotation of the wheel. The method includes the steps of moving the wheel between a toe-in position whereat the gauge is calibrated, and a toe-out position whereat the steering axis inclination of the wheel is determined from the gauge.

9 Claims, 3 Drawing Figures

U.S. Patent　　　Oct. 15, 1985　　　4,546,548
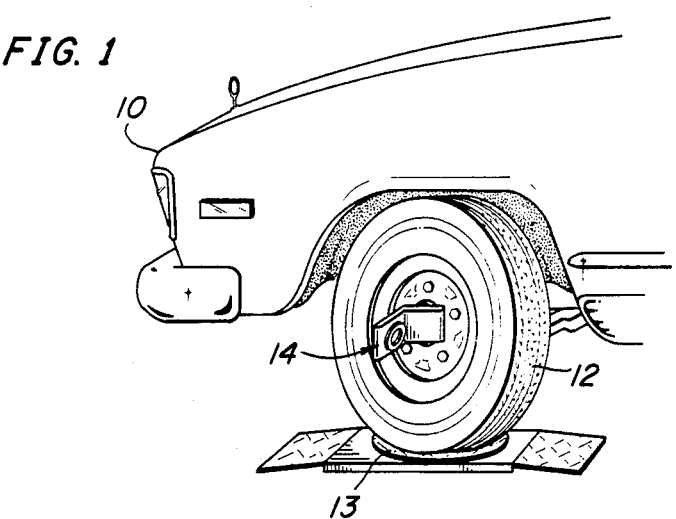
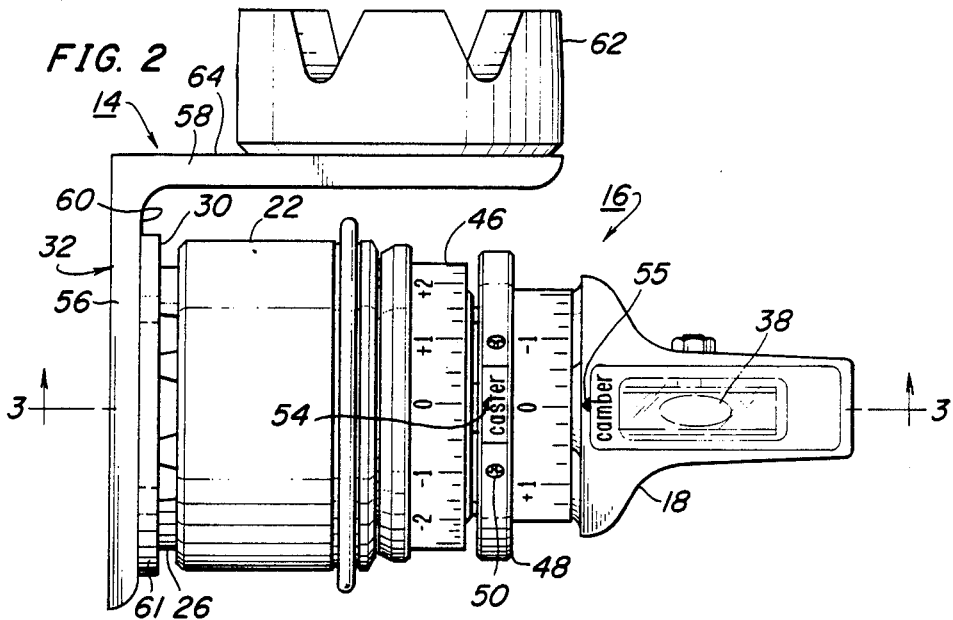
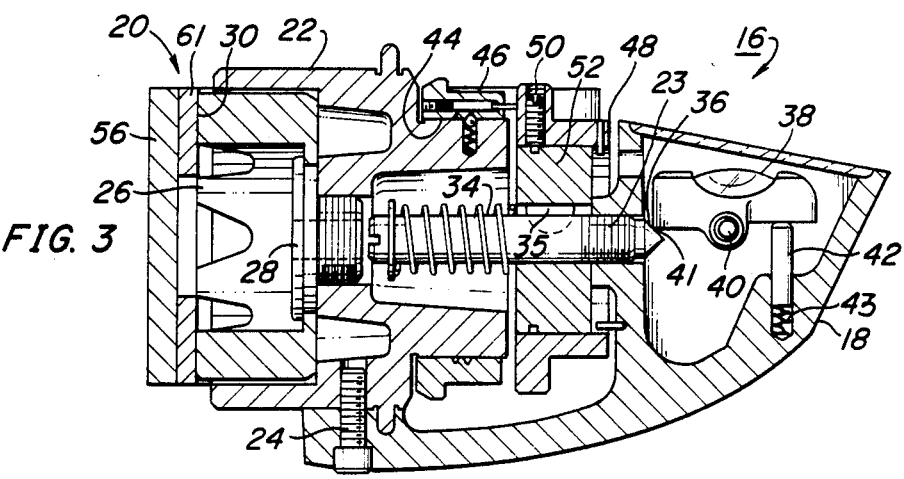

DEVICE AND METHOD FOR MEASURING STEERING AXIS INCLINATION OR A STEERABLE WHEEL

BACKGROUND OF THE INVENTION

This invention relates to the measurement of steerable wheel geometry. More particularly the invention relates to a device and method for measuring the steering axis inclination of a steerable wheel, and in still greater particularity the invention relates to a device and method for expanding the capabilities of a caster-camber measuring gauge for measuring steering axis inclination.

Various devices have been devised for measuring the individual steerable wheel geometric relationships known as caster and camber. One such device to which the present invention applies is disclosed in U.S. Pat. Nos. 3,520,064 and 4,114,283. The latter patent discloses various improvements to the gauge of the former patent. The gauges disclosed in these patents, and in particular the gauge of U.S. Pat. No. 4,114,283, are compact, accurate, easy to use gauges. However, neither of these gauges are, in the absence of the invention disclosed herein, capable of measuring the relationship known as steering axis inclination. Steering axis inclination is the tilt of the spindle support arm along a vertical plane parallel to the spindle and perpendicular to a plane parallel with the wheel, and is an important relationship for proper operation of the vehicle in which the steerable wheel arrangement is utilized. In general, for modern applications, the steering axis inclination is a fixed non-adjustable relationship that either falls in or out of a predetermined range of permissible values. Normally, if after adjusting the variable relationships camber and caster, the steering axis inclination does not fall within the permissible range, there is an indication that structural damage to a steering member is present. Most often the damage is to the spindle support arm itself. Without means for measuring steering axis inclination, serious structural damage can go undetected resulting in improper operation of the vehicle, and in more extreme cases, the vehicle can be unsafe to operate.

Devices and methods for measuring the steering axis inclination exist, however they most often use sensitive and bulky optical and light projection systems that require fine and precise calibration, care and handling by service personnel. There is a need for a device and method that allows steering axis inclination to be measured easily, fast, accurately and with minimum manipulation of equipment by personnel.

SUMMARY OF THE INVENTION

The present invention overcomes the shortcomings of the prior art by expanding the measuring capabilities of the existing caster-camber gauge mentioned hereinabove. The invention provides for a magnetic device that orientates the caster-camber gauge perpendicular to the wheel spindle instead of in its heretofore normal position parallel to the wheel spindle. The gauge includes interlocking, rotable indicating wheels calibrated to normally read angles of caster and camber when mounted parallel to the spindle. By mounting the gauge perpendicular to the wheel spindle, and moving the wheel and gauge through a predetermined arc, the steering axis inclination of the spindle support can be read directly from the caster scale on the gauge.

The invention will become better understood to those skilled in the field after reading the following detailed description in conjunction with the accompanying drawings.

BRIEF DESCRIPTION OF THE DRAWINGS

FIG. 1 is a perspective view of a wheel with the preferred embodiment of the adaptor of the present invention in place.

FIG. 2 is a top view of the preferred embodiment showing the caster-camber gauge assembled onto the adaptor.

FIG. 3 is a vertical longitudinal cross-sectional view of the caster-camber gauge and adaptor of FIG. 3.

DETAILED DESCRIPTION OF THE PREFERRED EMBODIMENT

Shown in FIG. 1, is a vehicle 10 having a steerable wheel 12 resting on a turntable 13 undergoing alignment. A steering axis inclination adaptor 14 of the present invention is shown mounted to the wheel spindle in place for receiving a caster-camber gauge 16. The gauge is shown mounted to the steering axis inclination adaptor in FIG. 2 and details of its construction are shown in FIG. 3. The description to follow includes only those details of gauge 16 that are necessary for carrying out the method of the present invention and for an understanding of its operation. The complete detailed description of all features of the preferred gauge is found in the above cited U.S. Pat. No. 4,114,283, and that disclosure is to be considered incorporated into the disclosure herein.

Referring to FIGS. 2 and 3, and as best shown in FIG. 3, gauge 16 includes a housing 18 having a magnetic mounting assembly 20 that includes a tubular member 22 secured to housing 18 by a threaded fastener 24. A permanent magnet 26 is held inside of tubular member 22 by threaded fastener 28. Magnet 26 extends out from member 22 for contacting planar magnetic mounting surface 30 of a magnetic member 61 that is attached to one leg 56 of the adaptor plate member 32, see FIG. 2.

Referring to FIG. 3, a shaft 34 having a tapered surface 36 extends through body member 22 and is positioned on the longitudinal axis of magnet 26. Shaft 34 is threaded on one end 23 so as to allow the shaft to move longitudinally within the gauge. A bubble level 38, pivotable about an axis 40, is mounted at one end of housing 22 such that one end 41 thereof contacts tapered surface 36. The level is biased by spring 43 through pin 42 so as to maintain contact with tapered surface 36.

Surrounding a reduced diametrical surface 44 of tubular member 22 is a caster wheel 46 calibrated in degrees of caster, as best shown in FIG. 2. Caster wheel 46 rotates around the longitudinal axis of magnet 26 and shaft 34 on surface 44. A camber wheel 48 is calibrated in degrees of camber and is secured to shaft 34 adjacent to, but independent from, caster wheel 46. Camber wheel 48 rotates shaft 34 as provided by fastener 50, which secures camber wheel 48 to an axial ring 52 that surrounds shaft 34. Ring 52, in turn, is connected to shaft 34 through key 35. It can be seen that camber wheel 48 turns shaft 34 causing the shaft to extend or retract toward or away from level end 41. As shaft 34 extends and retracts, level end 41 rides along surface 36 causing the level to pivot about axis 40 in a direction corresponding to the direction of movement of shaft 34 and camber wheel rotation. Camber wheel 48 provides for positioning the level at a reference position to indicate that the gauge is in a horizontal plane. In this position the camber wheel is also positioned at a reference position 55 on housing 18 indicating the gauge is in the horizontal plane. Camber wheel 48 includes a reference mark 54 adjacent the caster scale and normally is used to indicate degrees of caster, but, as disclosed herein below, is used to indicate degrees of steering axis inclination when the gauge is used to carry out the method of the present invention.

It has been determined that this caster-camber gauge can be used to measure steering axis inclination by mounting the gauge to the wheel hub or spindle so that the pivot axis of the level is orientated parallel to the axis of rotation of the wheel, rather than perpendicular thereto, as when measuring caster and camber, and manipulating the caster and camber scale wheels, and the vehicle wheels, in a predetermined sequence.

Shown in FIGS. 1 and 2 is adaptor 14 having a plate member 32 made up of two flanges 56, 58 orientated at right angles to one another. In the embodiment shown in FIG. 2, the adaptor has a magnetic member 61 for defining a planar magnetic mounting surface 30 on the inside surface 60 of first flange 56. A permanent magnet 62 having a configuration acceptable for being received onto the hub of the vehicle wheel is secured to outer surface 64 of second flange 58 and secures the adaptor to the wheel hub.

Magnet 62 and magnetic member 61 are secured to respective flanges 56, 58 by conventional techniques, such as by threaded fasteners or adhesives. Flanges 56, 58 can be made of steel so as to define the planar magnetic mounting surface 30 without the need for a separate magnetic member if desired. However, the preferred material for plate member 32 is aluminum which provides for a light-weight adaptor.

PREFERRED MODE OF OPERATION

In use, the vehicle wheels are positioned on the turntables and the wheel camber and caster is measured and adjusted to their designed settings. To check for suspected damage, such as to the spindle support, the steering axis inclination is measured. The wheels are placed in their straight ahead steering position and the steering axis inclination adaptor is mounted to the end of the wheel spindle being checked by placing the permanent magnet against the wheel hub. The adaptor is orientated so that the planar magnetic mounting surface lies in a vertical plane parallel to the axis of wheel rotation and faces to the rear of the vehicle.

The caster-camber gauge is then mounted to the magnetic mounting surface of the adaptor with the level positioned upwardly and toward the rear of the vehicle, thereby orientating the levels pivot axis parallel to the axis of rotation of the wheel. With the gauge so positioned, the wheel being checked is moved to a predetermined toe-in position from the straight ahead, for example, 10 degrees. The gauge and adaptor are then adjusted to a reference position by rotating the camber and caster wheels so as to orientate the zero degree marks of each scale opposite the respective reference marks, and then, without disturbing the zero reference settings, the adaptor and gauge are rotated as an assembly on the wheel hub until the level indicates that the gauge is in the horizontal position. Alternately, if desired, the adaptor and gauge can be mounted to the wheel after first positioning the wheel at the toe-in position. Because the gauge and adaptor are set to the respective reference settings at the toe-in position, it is not imperative that they be initially mounted with the wheel in the straight ahead position. The wheel is then positioned at a toe-out position from the straight ahead an amount equal to the degree of toe-in previously performed. The camber wheel 48 on the gauge is then rotated independently, and without moving the caster wheel, until the level again indicates that the gauge is in the horizontal position. The steering axis inclination is then read from the caster scale opposite the reference mark on the camber scale.

For the gauge described herein, and for the predetermined angle of 10 degrees, it has been found that the angle obtained from the caster scale is representative of the steering axis inclination, and to obtain the true angle the reading from the caster scale must be increased by a factor of 2. It is of course possible to provide further gauges with a third steering axis inclination scale calibrated to read the steering axis inclination directly. Also, existing gauges of the type described herein may be retrofitted with scales calibrated directly in degrees of steering axis inclination. However, because the correction factor is an even multiple, it is not contemplated that service personnel will encounter difficulty in calculating the actual steering axis inclination angle after performing the steps set out.

Having described the preferred embodiment of the invention, those skilled in the art having the benefit of the description and accompanying drawings can readily devise other embodiments and modifications, therefore, said other embodiments and modifications are to be considered within the scope of the appended claims.

What is claimed:

1. A method of measuring the steering axis inclination of a steerable wheel mounted on a spindle with a caster gauge having adjustable means operatively associated with a caster scale for determining the angle of the spindle from the horizontal within a vertical plane comprising the steps of:

magnetically mounting to the hub of the wheel an adaptor having a planar magnetic mounting surface lying parallel to the axis of rotation of the wheel;
   moving the wheel to a first predetermined angular position to one side of a stright ahead position;
   magnetically mounting said caster gauge to said planar magnetic mounting surface in a horizontal plane perpendicular to the spindle;
   adjusting the angle determining means to a reference position;
   moving the wheel to a second predetermined position to the opposite side of the straight ahead position;
   adjusting the angle determining means to determine the magnitude of vertical angular movement of the spindle between the first and second positions;
   determining from the caster scale the amount of movement of the angle determining means which effected said determination of the magn tude of vertical angular movement of the spindle; and,
   calculating the steering axis inclination using said determined amount of movement of the angle determining means.

2. The method as defined in claim 1 wherein
   the first and second predetermined positions are angularly spaced from the straight ahead position.

3. A method of measuring the steering axis inclination of a steerable wheel using a caster-camber gauge having an adjustable caster scale and an adjustable camber scale operatively connected to a pivotable level and operatively associated with the caster scale comprising the steps of:

magnetically mounting to the hub of the wheel an adaptor having a planar magnetic mounting surface lying parallel to the axis of rotation of the wheel;

magnetically mounting the caster gauge to the planar magnetic mounting surface;

steering the wheel to a first predetermined angular position to one side of the straight ahead steering position;

adjusting the camber scale to a reference position defining a horizontal orientation of the level;

adjusting the caster scale to a reference position relative to the camber scale;

adjusting the adaptor in relation to the wheel so as to position the level in the horizontal position;

steering the wheel to a second predetermined angular position to the opposite side of the stright ahead steering position;

adjusting the camber scale to reposition the level in the horizontal position;

determining from the caster scale the angular movement of the camber scale required to reposition the level in the horizontal position; and calculating the steering axis inclination of the wheel using the amount of camber scale movement as determined from the caster scale.

4. A method of measuring the steering axis inclination of a steerable wheel using a caster gauge having a dial for adjusting the angle of a pivotable level comprising the steps:

magnetically mounting to the hub of the wheel an adaptor having a planar magnetic mounting surface lying parallel to the axis of rotation of the wheel;

magnetically mounting the caster gauge to the planar magnetic mounting surface;

steering the wheel to a first predetermined angular position to one side of the straight ahead steering position of the wheel;

adjusting the dial to a reference position for placing the level in the horizontal position;

adjusting the adaptor relative to the wheel to position the planar magnetic mounting surface in the vertical plane and with the pivot axis of the level in parallel relationship with the axis of rotation of the wheel;

steering the wheel to a second predetermined angular position to the opposite side of the straight ahead steering position of the wheel;

adjusting the position of the dial to reposition the level in the horizontal position;

determining the amount of movement of said dial which effected the repositioning of the level in the horizontal position; and, calculating the steering axis inclination of the wheel using the amount of movement of the dial.

5. The method as defined in claim 4 further comprising the step:

measuring the camber of the wheel with the gauge prior to mounting the adaptor to the wheel.

6. The method as defined in claim 5 wherein the caster gauge includes a permanent magnet for mounting the gauge to the planar magnetic mounting surface of the adaptor; and, the adaptor includes a permanent magnet for mounting the adaptor to the hub of the wheel.

7. An adaptor for expanding the measurement capabilities of a caster-camber gauge to include measurement of the steering axis inclination of a steerable wheel comprising:

a member having at least two surfaces located at right angles to each other;

a permanent magnet affixed to the first surface for mounting said member to a planar magnetic mounting surface on the wheel, with the second surface lying in a plane parallel to the axis of rotation of the wheel; and, a planar magnetic mounting surface associated with the second surface for magnetically attaching a magnet affixed to the gauge to said member, whereby the gauge is orientated with respect to the wheel for measuring steering axis inclination.

8. The adaptor as defined in claim 7 wherein said planar magnetic mounting surface is annular.

9. The adaptor as defined in claim 7 wherein said member comprises:

a first flange having an inner and an outer surface; and, a second flange having an inner and an outer surface adjoining said first flange at right angles thereto, the outer surface of said first flange defining said member's first surface to which said permanent magnet is affixed, and the inner surface of said second flange defining said member's second surface to which said planar magnetic mounting surface is associated.

* * * * *